United States Patent
Shin

(10) Patent No.: US 9,851,492 B2
(45) Date of Patent: Dec. 26, 2017

(54) DISPLAY DEVICE

(75) Inventor: JungChul Shin, Gyeongsangbuk-do (KR)

(73) Assignee: LG DISPLAY CO., LTD., Seoul (KR)

( * ) Notice: Subject to any disclaimer, the term of this patent is extended or adjusted under 35 U.S.C. 154(b) by 652 days.

(21) Appl. No.: 13/586,386

(22) Filed: Aug. 15, 2012

(65) Prior Publication Data

US 2013/0050820 A1    Feb. 28, 2013

(30) Foreign Application Priority Data

Aug. 26, 2011 (KR) .................. 10-2011-0085905

(51) Int. Cl.
G02F 1/1333 (2006.01)
F21V 8/00 (2006.01)
G06F 1/16 (2006.01)

(52) U.S. Cl.
CPC ..... *G02B 6/0088* (2013.01); *G02F 1/133308* (2013.01); *G06F 1/1601* (2013.01); *G06F 1/1637* (2013.01); *G02F 2001/133317* (2013.01); *G02F 2001/133322* (2013.01); *G02F 2001/133328* (2013.01); *G02F 2001/133331* (2013.01); *G02F 2201/465* (2013.01); *G02F 2201/54* (2013.01)

(58) Field of Classification Search
CPC ................ G02B 6/0068; G02F 1/133308
USPC ......... 349/58, 149; 361/600, 679.21, 679.22, 361/679.09, 679.55, 679.6, 714
See application file for complete search history.

(56) References Cited

U.S. PATENT DOCUMENTS

| | | | |
|---|---|---|---|
| 7,165,875 B2 * | 1/2007 | Ohtomo et al. | 362/632 |
| 7,233,371 B2 * | 6/2007 | Ahn | G02F 1/133308 349/58 |
| 7,868,968 B2 * | 1/2011 | Sudo | 349/58 |
| 7,894,016 B2 * | 2/2011 | Hamada | G02B 6/0068 349/58 |
| 8,294,867 B2 * | 10/2012 | Ohashi et al. | 349/149 |
| 8,421,947 B2 * | 4/2013 | Cho | G02F 1/133615 349/58 |
| 8,502,933 B2 * | 8/2013 | Park et al. | 349/58 |
| 2008/0101001 A1 * | 5/2008 | Shin et al. | 361/681 |
| 2009/0122218 A1 * | 5/2009 | Oh et al. | 349/58 |
| 2011/0141391 A1 | 6/2011 | Kim et al. | |
| 2011/0187956 A1 * | 8/2011 | Kim | G02F 1/1333 349/58 |

FOREIGN PATENT DOCUMENTS

| | | |
|---|---|---|
| CN | 101729835 A | 6/2010 |
| CN | 102033582 A | 4/2011 |
| CN | 102053394 A | 5/2011 |
| KR | 10-1998-0075053 A | 11/1998 |
| KR | 10-2000-0050884 A | 8/2000 |

(Continued)

*Primary Examiner* — Audrey Y Chang

(74) *Attorney, Agent, or Firm* — Birch, Stewart, Kolasch & Birch, LLP

(57) ABSTRACT

Disclosed is a display device with a minimum bezel, the display device comprising a display panel for displaying an image; a guide frame connected to the display panel to support the display panel; and a rear cover for supporting the guide frame, wherein the guide frame covers an edge portion of the rear cover and exposes the front surface of the display panel to the outside of the display device.

15 Claims, 9 Drawing Sheets

(56) References Cited

FOREIGN PATENT DOCUMENTS

| KR | 10-2008-0058911 A | 6/2008 |
|----|-------------------|--------|
| KR | 10-2008-0062923 A | 7/2008 |
| KR | 10-2011-0067445 A | 6/2011 |

* cited by examiner

DISPLAY DEVICE

This application claims the priority and the benefit under 35 U.S.C. §119(a) on Korean Patent Application No. 10-2011-0085905 filed on Aug. 26, 2011, the entire contents of which are hereby incorporated by reference.

BACKGROUND

Field of the Invention

The present disclosure relates to a display device, and more particularly, to a display device with a minimum bezel.

Discussion of the Related Art

Various flat-panel display devices, for example, liquid crystal display device, plasma display panel, and organic light emitting display device, etc., have been researched and developed to substitute for CRT (Cathode Ray Tube). These flat-panel display devices are used for mobile information device, television, monitor, tablet computer, and notebook computer.

FIG. 1 illustrates a conventional display device used for a notebook computer.

Referring to FIG. 1, the conventional display device 10 is rotatably connected to a system body 30 by a hinge 20.

The system body 30 includes a control circuit for processing various information, for example, a CPU (Central Processing Unit); a graphic card for processing data under the control of the CPU; various storing mediums for storing control programs, information and data; and a power unit for supplying power energy. The system body 30 processes various information, and simultaneously displays video information on the display device 10. The hinge 20 is connected between the system body 30 and the display device 10, to thereby rotatably support the display device 10 used to connect the display device 10 to the system body 30 in such a way that the display device 10 is rotatable about the system body 30.

Generally, the display device 10 includes a display panel 12; a rear cover 14 for receiving the display panel 12 therein; and a front cover 16 connected with the lower rear cover 14, wherein the front cover 16 covers the region of the display panel 12 other than the effective display region of the display panel 12 for displaying the video information.

The display panel 12 displays the video information provided from the system body 30. The display panel 12 is supported by a guide frame (not shown) which is supported by a supporter (not shown) received in the lower rear cover 14.

The lower rear cover 14 is rotatably connected to the system body 30 by the hinge 20, and receives the display panel 12 therein.

The front cover 16 is formed in a frame of a rectangular shape having front surface and side surface. The front surface of the front cover 16 covers the front edge portion of the display panel 12, and the side surface of the front cover 16 is connected with the rear cover 14 so as to cover the side of the display panel 12.

In case of the conventional display device 10, a width (W) of the bezel of the display panel 12 is increased when a width of the front surface of the front cover 16 is increased.

BRIEF SUMMARY

A display device comprises: a display panel for displaying an image; a guide frame connected to the display panel to support the display panel; and a rear cover for supporting the guide frame, wherein the guide frame covers an edge portion of the rear cover and exposes the front surface of the display panel to the outside of the display device.

The rear cover includes: a rear plate for covering the rear surface of the display panel; and a sidewall formed by vertically bending from the rear plate and for supporting the guide frame, wherein the sidewall is covered by the guide frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Figure 1:
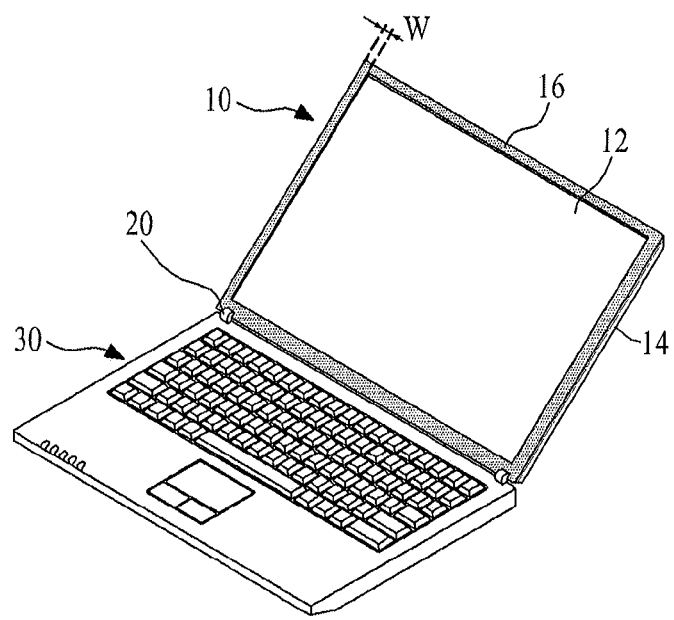
FIG. 1 illustrates a conventional display device used for a notebook computer.
Figure 2:
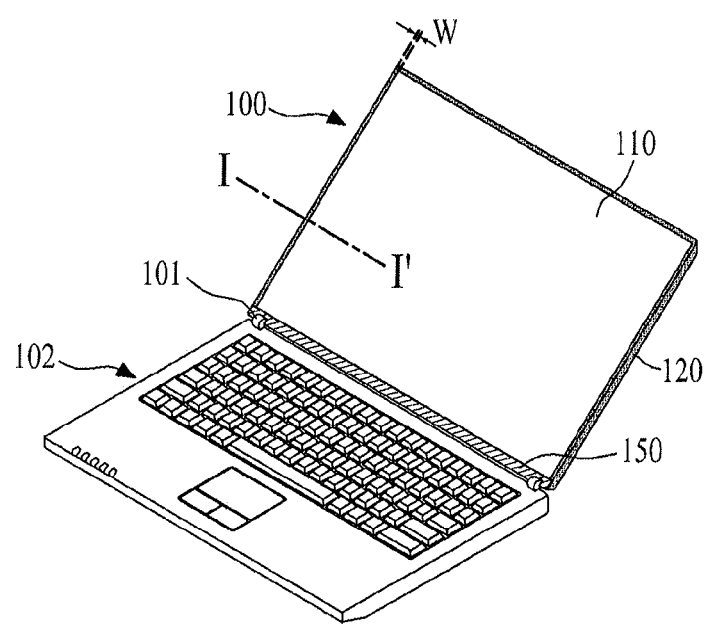
FIG. 2 illustrates a display device according to the first embodiment of the present invention, which is used for a notebook computer.
Figure 3:
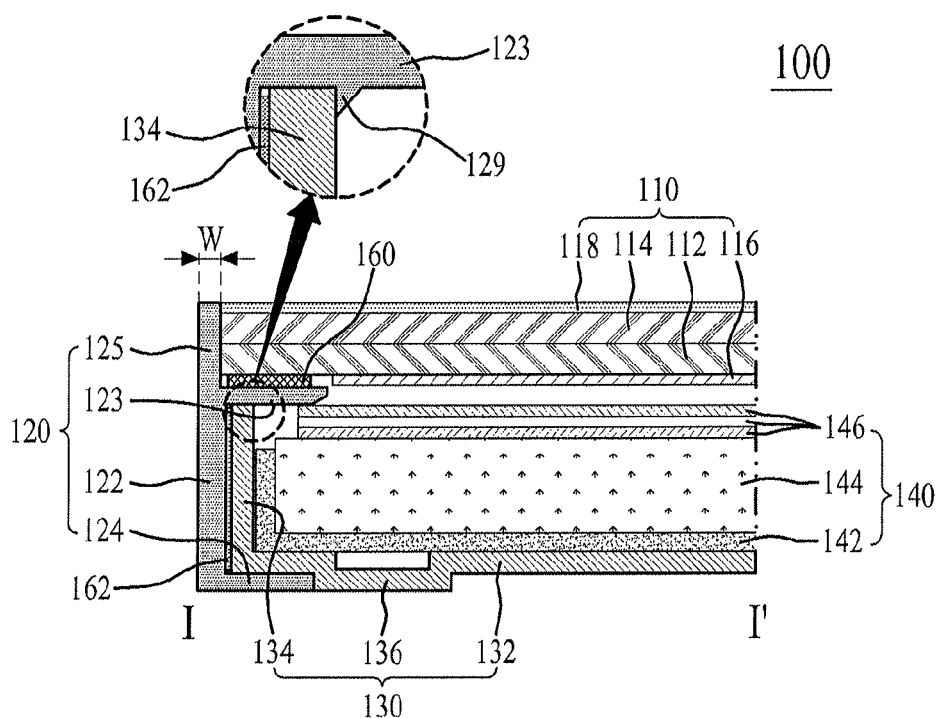
FIG. 3 is a cross sectional view taken along I-I' line of FIG. 2.

FIG. 2 illustrates a display device according to the first embodiment of the present invention, which is used for a notebook computer. FIG. 3 is a cross sectional view taken along I-I' line of FIG. 2.

Referring to FIGS. 2 and 3, the display device 100 according to the first embodiment of the present invention includes a display panel 110; a guide frame 120 which is connected to the display panel 110 to support the display panel 110 and to expose the effective display region of the display panel 110; and a rear cover 130 which supports the guide frame 120, wherein the side surface of the rear cover 130 is covered by the guide frame 120.

The display device 100 with the above structure is rotatably connected to a system body 102 by a hinge 101.

The system body 102 includes a control circuit for processing various information, for example, a CPU (Central Processing Unit); a graphic card for processing data under the control of the CPU; various storing mediums for storing control programs, information and data; and a power unit for supplying power energy. The system body 102 processes various information, and simultaneously displays video information on the display device 100.

The hinge 101 is used to connect the display device 100 to the system body 102 in such a way that the display device 100 is rotatable about the system body 102.

The display panel 110 includes first and second substrates 112 and 114 which are bonded to each other with a liquid crystal layer (not shown) interposed therebetween; a first polarizing member 116 attached to the first substrate 112; and a second polarizing member 118 attached to an upper surface of the second substrate 114.

The first substrate 112 includes a plurality of gate lines (not shown), a plurality of data lines (not shown), and a plurality of pixels (not shown) defining by the gate and data lines crossing each other. Each pixel may include a thin film transistor (not shown) connected with a gate line and a data line; a pixel electrode connected with the thin film transistor; and a common electrode formed close to the pixel electrode and supplied with a common voltage. According to a driving method of liquid crystal layer, the common electrode may be formed on the second substrate 114. Also, an electric field is formed by a differential voltage between common voltage and data voltage and is applied to each pixel, thereby light transmittance of the liquid crystal layer is controlled.

The second substrate 114 includes a color filter corresponding to each pixel of the first substrate 112. The first and second substrates 112 and 114 facing each other are bonded, with the liquid crystal layer interposed therebetween. In this case, according to a driving method of liquid crystal layer, the common electrode supplied with the common voltage may be formed on the second substrate 114. Predetermined color light is emitted from the second substrate after the color filter filters light incident on the liquid crystal layer, thereby a predetermined colored image is displayed on the display panel 110.

On the basis of driving modes of the liquid crystal layer, for example, TN (Twisted Nematic) mode, VA (Vertical Alignment) mode, IPS (In-Plane Switching) mode, and FFS (Fringe Field Switching) mode, the first and second substrates 112 and 114 may be formed in various detailed structures which are generally known to those in the art.

The above display panel 110 may further include a plurality of circuit films (not shown) attached to a pad (not shown) disposed at one side of the first substrate 112; and a printed circuit board (PCB, not shown) attached to the plurality of circuit films. The pad is disposed at one side of the first substrate 112 and adjacent to the hinge 101. The plurality of circuit films may be attached to the first substrate 112 and PCB (not shown) by TAB (Tape Automated Bonding) process, wherein the circuit films may be formed of TCP (Tape Carrier Package) or COF (Chip On Flexible Board or Chip On Film).

Meanwhile, the pad disposed at one side of the first substrate 112 may be covered by a deco cover 150 connected to the guide frame 120. The deco cover 150 covers one edge portion of the display panel 110 at which the pad is disposed.

The first polarizing member 116 may be formed of a polarizing film attached to a lower surface of the first substrate 112 so as to polarize light irradiated on the first substrate 112.

Figure 4A:
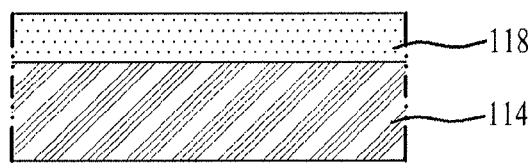
FIGS. 4A and 4B illustrate a second polarizing member shown in FIG. 3.

As shown in FIG. 4A, the second polarizing member 118 according to one embodiment of the present invention may include an upper polarizing film connected (or attached) to an upper surface of the second substrate 114 so as to polarize color light emitted from the second substrate 114.

Figure 4B:
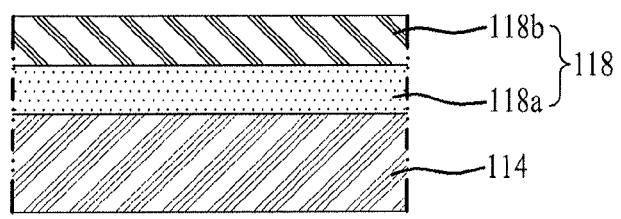

As shown in FIG. 4B, the second polarizing member 118 according to another embodiment of the present invention may include an upper polarizing film 118a and a stereoscopic optical member 118b, wherein the upper polarizing film 118a is connected (or attached) to an upper surface of the second substrate 114 so as to polarize color light emitted from the second substrate 114; and the stereoscopic optical member 118b is connected (or attached) to the upper polarizing film 118a so as to convert 2-dimensional image displayed into 3-dimensional image.

The stereoscopic optical member 118b according to one embodiment of the present invention may be a retarder film to convert the 2-dimensional image into the dimensional image including an image seen through the left eye (hereinafter, referred to as 'left-eye image') and an image seen through the right eye (hereinafter, referred to as 'right-eye image').

The stereoscopic optical member 118b according to another embodiment of the present invention may be an active retarder panel to realize the 3-dimensional image by converting linearly polarized image obtained by the driving of liquid crystal into circularly polarized left-eye image or right-eye image.

The display panel 110 controls transmittance of light emitted from the backlight unit 140, to thereby display predetermined image.

The backlight unit 140, which is received in the rear cover 130, emits light to the entire lower surface of the display panel 110. For this end, the backlight unit 140 includes a reflective sheet 142, a light guide plate 144, and an optical sheet member 146.

The reflective sheet 142 is provided on the lower surface of the light guide plate 144 and positioned in the rear cover 130, wherein the reflective sheet 142 reflects the light guided by the light guide plate 144 toward the display panel 100.

The light guide plate 144 is formed in a shape of plate (or wedge) having at least one surface as a light-incidence surface and one surface as a light-emitting surface, whereby the reflective sheet 142 reflects the light which is incident from the light guide plate 144 toward the display panel 110. In this case, the light source may include fluorescent lamp or light emitting diode. Among the surfaces of the light guide plate 144, other surfaces except the light-incidence surface on which the light from the light source (not shown) is incident and the light-emitting surface through which the light is reflected toward the display panel 110 by the reflective sheet 142, that is, the non-light incidence and emitting surfaces may be covered by the reflective sheet 142. For this end, the reflective sheet 142 can be designed to have an appropriate shape to cover all of the non-light incidence and emitting surfaces of the light guide plate 144.

The optical sheet member 146 is provided on the light guide plate 144 to improve luminance properties of the light proceeding toward the display panel 110 from the light guide plate 144. For this end, the optical sheet member 146 may be comprised of at least one diffusion sheet and at least one prism sheet.

The guide frame 120 is connected to a lower edge portion of the display panel 110 by using a panel connection member 160 such as double-sided tape or adhesive disposed on a panel connection portion 123 to support the display panel 110. This guide frame 120 further covers the side surfaces of the display panel 110 except the entire upper surface of the display panel 110 by using a panel cover portion 125. The panel connection portion 123 and the panel cover portion 125 will be described in more detail later. That is, the guide frame 120 does not cover any portion of the upper surface of the display panel 110 but the side surfaces of the display panel 110 and the lower edge portion of the display panel 110. Moreover, the guide frame 120 is formed to cover a part of the rear cover 130 by using a guide sidewall 122 and a rear cover portion 124 which will be described in more detail later. A detailed structure of the guide frame 120 including the guide sidewall 122, the panel connection portion 123, the rear cover portion 124 and the panel cover portion 125 will be explained in more detail later.

The panel connection member 160 may be connected to the lower edge of the first substrate 112, or connected to the lower edge of the first polarizing member 116.

The rear cover 130 includes a rear plate 132 for covering the lower surface of the display panel 110; and a sidewall 134 for supporting the guide frame 120, wherein the sidewall 134 is formed by vertically bending from the rear plate 132.

The rear plate 132 supports the backlight unit 140, and simultaneously covers the lower surface of the display panel 110.

The sidewall 134 is formed by vertically bending from each edge portions of the rear plate 132, wherein the sidewall 134 supports the guide frame 120. The sidewall 134 is covered by the guide frame 120, that is, the sidewall 134 is not exposed to the outside of the display device.

The rear cover 130 supports the backlight unit 140 and the guide frame 120, and forms the display device 100 together with the backlight unit 140, the guide frame 120, the display panel 110 and the backlight unit 140. In this respect, it is necessary that the rear cover 130 have high stiffness. For this end, the rear cover 130 may further include a protrusion 136 protruded from the rear surface of the rear plate 132 a predetermined height and away from the sidewall 134 a predetermined distance. In this case, the protrusion 136 having the predetermined height may or may not protruded vertically from the rear surface of the rear plate 132. The protrusion 136 enhances stiffness of the rear cover 130.

Meanwhile, the rear cover 130 may further include a reinforcement bar (not shown) for reinforcing stiffness of the rear plate 132, wherein the reinforcement bar is provided on the lower surface of the rear plate 132.

Figure 5:
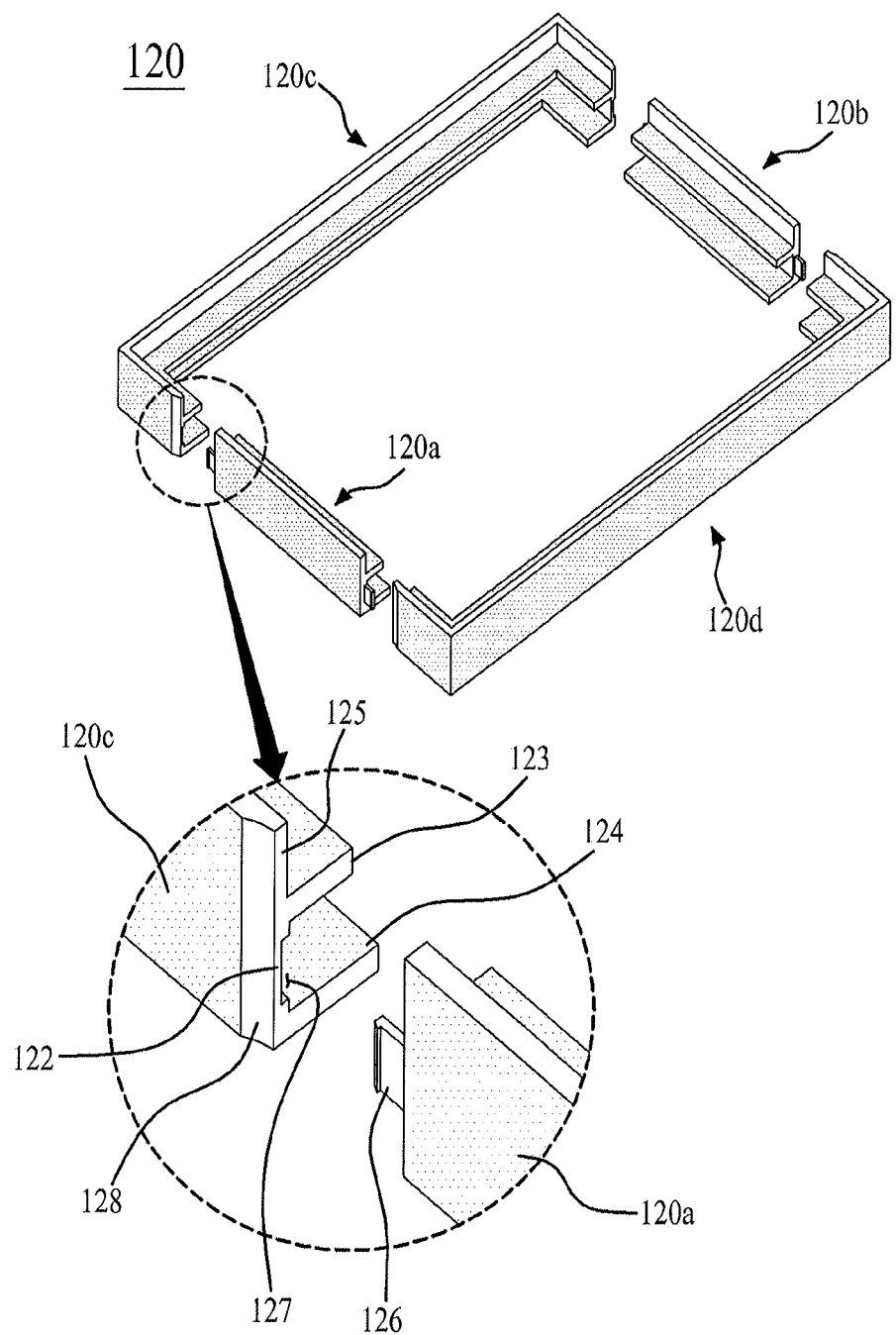
FIG. 5 is a perspective view illustrating the guide frame shown in FIG. 3, which includes four partial frames, i.e., the first to fourth partial frames in a separate state.

FIG. 5 illustrates the guide frame shown in FIG. 3 in more detail.

Referring to FIG. 5 and FIG. 3, the guide frame 120 is comprised of four partial frames, i.e., the first to fourth partial frames 120a, 120b, 120c, and 120d which are combined to form a guide frame of a rectangular shape. Each of the first to fourth partial frames 120a, 120b, 120c, and 120d includes a guide sidewall 122, a panel connection portion 123, a rear cover portion 124, and a panel cover portion 125, as shown in the dotted line circular portion.

The first partial frame 120a is formed in a shape of "–", that is, in a bar shape "–". The first partial frame 120a is connected to the first short side of the sidewall 134 in a sliding way, whereby the first partial frame 120a almost covers the first short side of the sidewall 134 except the corner portion of the first short side of the sidewall 134, and the first partial frame 120a is also connected to the lower border portion of the first short side of the display panel 110.

The second partial frame 120b is formed in the same shape as the first partial frame 120a, wherein the first and second partial frames 120a and 120b are provided symmetrically. The second partial frame 120b is connected to the second short side of the sidewall 134 in a sliding way, whereby the second partial frame 120b almost covers the second short side of the sidewall 134 except the corner portion of the second short side of the sidewall 134, and the second partial frame 120b is also connected to the lower border portion of the second short side of the display panel 110.

The third partial frame 120c is formed in a shape of "[" having two bending portions. The third partial frame 120c is connected to the first long side of the sidewall 134 and one corner portion of each of the first and second short sides of the sidewall 134, and connected to one side of each of the first and second partial frames 120a and 120b, whereby the third partial frames 120c covers the first long side of the sidewall 134 and one corner portion of each of the first and second short sides of the sidewall 134, and the third partial frame 120c is also connected to the first long side of the display panel 110, and the lower border portion of each one corner portion of the first and second short sides of the display panel 110.

The fourth partial frame 120d is formed in the same shape as the third partial frame 120c, wherein the third and fourth partial frames 120c and 120d are provided symmetrically. The fourth partial frame 120d is connected to the second long side of the sidewall 134 and the other corner portion of each of the first and second short sides of the sidewall 134, and connected to the other side of each of the first and second partial frames 120a and 120b, whereby the fourth partial frame 120d covers the second long side of the sidewall 134 and the other corner portion of each of the first and second short sides of the sidewall 134, and the fourth partial frame 120d is also connected to the second long side of the display panel 110, and the lower border portion of each other one corner portion of the first and second short sides of the display panel 110. The fourth partial frame 120d may be covered by the aforementioned deco cover 150 arranged at one side of the display panel 110 at which the pad is disposed.

As mentioned above, each of the first to fourth partial frames 120a, 120b, 120c, and 120d includes a guide sidewall 122, a panel connection portion 123, a rear cover portion 124, and a panel cover portion 125.

The guide sidewall 122 is vertically formed to have a first predetermined height, and is exposed to the outside of the display device so as to cover the sidewall 134 of the rear cover 130, whereby the guide sidewall 122 functions as a side cover of the display device 100. The guide sidewall 122 may be connected to the outer surface of the sidewall 134 by using the frame connection member 162 such as double-sided tape or adhesive. Meanwhile, if both the guide frame 120 and the rear cover 130 are formed of metal, the guide sidewall 122 may be connected to the outer surface of the sidewall 134 by a stamping method.

The panel connection portion 123 horizontally protrudes from the inner surface of the guide sidewall 122 at the upper end of the guide sidewall 122 to have a first predetermined length, the panel connection portion 123 having the predetermined length is connected to the lower border portion of the display panel 110. The panel connection portion 123 is connected to the lower border portion of the display panel 110 by using the panel connection member 160 such as double-sided tape or adhesive.

The rear cover portion 124 horizontally protrudes from the inner surface of the guide sidewall 122 at the lower end of the guide sidewall 122 to have a second predetermined length, the rear cover portion 124 covers the rear border portion of the rear cover 130. In this case, the rear cover portion 124 matches the protrusion 136 provided in the rear plate 132 so as to be in contact with the protrusion 136 in the same plane as the protrusion 136. The rear cover portion 124 may be connected to the rear border portion of the rear plate 132 by using coupling screw or coupling member. In this case, it is possible to omit the frame connection member 162 for connecting the aforementioned guide sidewall 122 to the sidewall 134.

The aforementioned guide sidewall 122, panel connection portion 123, and rear cover portion 124 may have cross section of a shape "[" so as to cover the upper and side surfaces of the sidewall 134 and the rear border portion of the rear plate 132, to thereby reinforce the stiffness of rear cover 130.

The panel cover portion 125 vertically protrudes from the upper surface of the guide sidewall 122 to have a second predetermined height, the panel cover portion 125 having the predetermined height covers the side of the display panel 110 which is connected to the panel connection portion 123. In this case, the upper surface of the panel cover portion 125 is positioned at the same height as the upper surface of the display panel 110 or the upper surface of the second polarizing member 118. The first and second predetermined height can be the same or different. Similar, the first and second predetermined length can be the same or different.

Meanwhile, the guide frame 120 may further include first and second hook members 126 and 127.

The first hook member 126 protrudes from the each of the first and second partial frames 120a and 120b toward the guide sidewall 122 of the third and fourth partial frames 120c and 120d respectively.

The second hook member 127 recesses from each of the third and fourth partial frames 120c and 120d to have a predetermined depth, so that the first hook member 126 is inserted into and connected to the second hook member 127.

Figure 6:
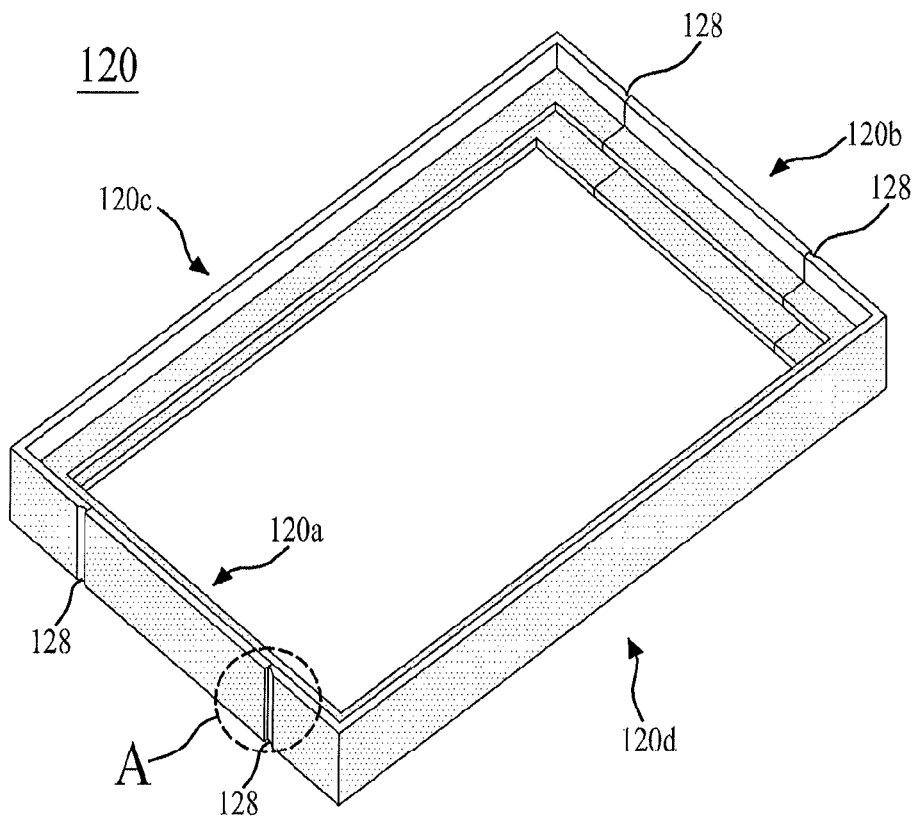
FIG. 6 illustrates a combination state of the first to fourth partial frames shown in FIG. 5.

As shown in FIG. 6, the first to fourth partial frames 120a, 120b, 120c, and 120d are combined to form the guide frame 120 of a rectangular shape by using the first and second hook members 126 and 127. In order to obtain the good aesthetic appearance of the guide frame 120 after the first to fourth partial frames 120a, 120b, 120c, and 120d are combined, a groove 128 may further be formed on at least one side of the first to fourth partial frames 120a, 120b, 120c, and 120d where they are connected each other.

Figure 7A:
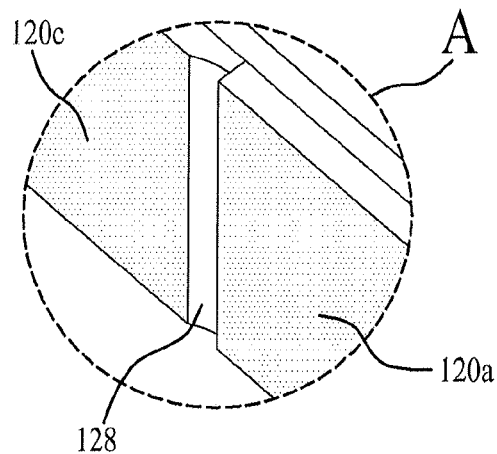
FIGS. 7A to 7C illustrate various embodiments of the details of the A portion of FIG. 6.
Figure 7B:
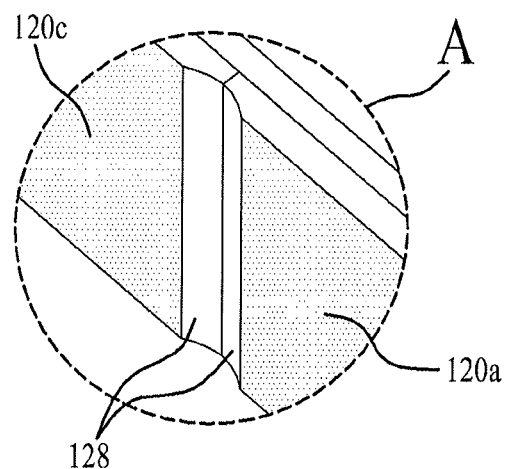
Figure 7C:
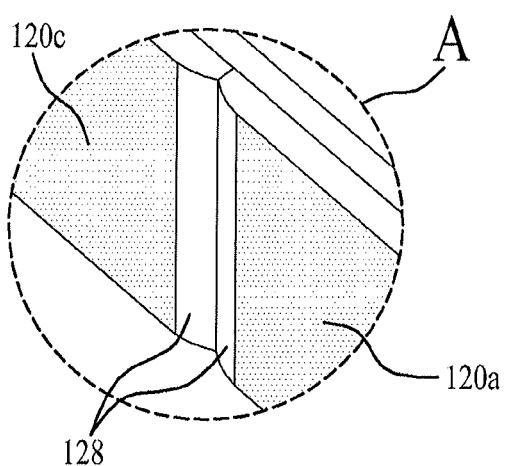

Specifically, the groove 128 can be formed on the outer surface of the end of the bending portion of the third and fourth partial frames 120c and 120d where the third and fourth partial frames 120c and 120d are combined with the first and second partial frames 120a and 120b. Similarly, the groove 128 can be formed on the outer surface of the end of the first and second partial frames 120a and 120b where the first and second partial frames 120a and 120b are combined with the third and fourth partial frames 120c and 120d. According to one embodiment of the present invention, the groove 128 may be slanted at a predetermined inclination, as shown in FIG. 7A; or the groove 128 may be curved concavely or convexly with a predetermined curvature, as shown in FIG. 7B or 7C. The groove 128 is exposed to the outside of the display device after the first to fourth partial frames 120a, 120b, 120c, and 120d are combined to form the guide frame 120, which is the side cover of the display device 100, to thereby obtain the good aesthetic appearance of the display device 100.

As mentioned above, the guide sidewall 122 in the first to fourth partial frames 120a, 120b, 120c, and 120d of the guide frame 120 and the sidewall 134 are connected by using the frame connection member 162, but it is not limited to this structure. The guide sidewall 122 and the sidewall 134 may be connected in various methods. For example, as shown in the enlarged view of FIG. 3, the guide frame 120 may further include a connection hook 129 to fix the sidewall 134.

The connection hook 129 may be provided in the panel connection portion 123 of each of the first to fourth partial frames 120a, 120b, 120c, and 120d to fix the sidewall 134. That is, the connection hook 129 protrudes from the lower surface of the panel connection portion 123 away from the inner surface of the guide sidewall 122 a distance equal to the thickness of the sidewall 134 to contact the sidewall 134. Accordingly, the first to fourth partial frames 120a, 120b, 120c, and 120d are connected to the sidewall 134 by the connection hook 129 and/or the aforementioned frame connection member 162.

A method of assembling the above display device 100 according to the first embodiment of the present invention will be described as follows.

First, the backlight unit 140 is received in a space formed by the rear cover 130.

Then, the guide frame 120 is connected to the rear cover 130. That is, the first and second partial frames 120a and 120b are respectively connected to the first and second short sides of the sidewall 134; and the third and fourth partial frames 120c and 120d are respectively connected to the first and second long sides of the sidewall 134, and also connected to the first and second partial frames 120a and 120b. Accordingly, the upper surface, side surface, and lower border portion of the rear cover 130 are covered by the first to fourth partial frames 120a, 120b, 120c, and 120d. The first to fourth partial frames 120a, 120b, 120c, and 120d are respectively connected to the sidewall 134 by the frame connection member 162, which can be formed on the outer surface of the sidewall 134 or the inner surface of the guide sidewall 122.

By the use of panel connection member 160, the display panel 110 can be connected to the panel connection portion 123 in each of the first to fourth partial frames 120a, 120b, 120c, and 120d. Accordingly, the side surface of the display panel 110 is covered by the panel cover portion 125 in each of the first to fourth partial frames 120a, 120b, 120c, and 120d.

Then, the deco cover 150 is connected to the rear cover 130, to thereby cover the lower portion of the display panel 110. Accordingly, the upper surface of the display panel 110 is exposed to the outside of the display device except the lower portion covered by the deco cover 150.

As mentioned above, the display device 100 according to the first embodiment of the present invention includes the guide frame 120 which supports the display panel 110, and covers the side of the display panel 110 and the edge portion of the rear cover 130. Thus, the display device 100 according to the first embodiment of the present invention has the narrow bezel (W) and the thin thickness because there is no need for a front cover used in the related art; and realizes the flat front surface of the display panel 110 except the deco cover 150, whereby the display device 100 according to the first embodiment of the present invention has the good aesthetic appearance.

Figure 8:
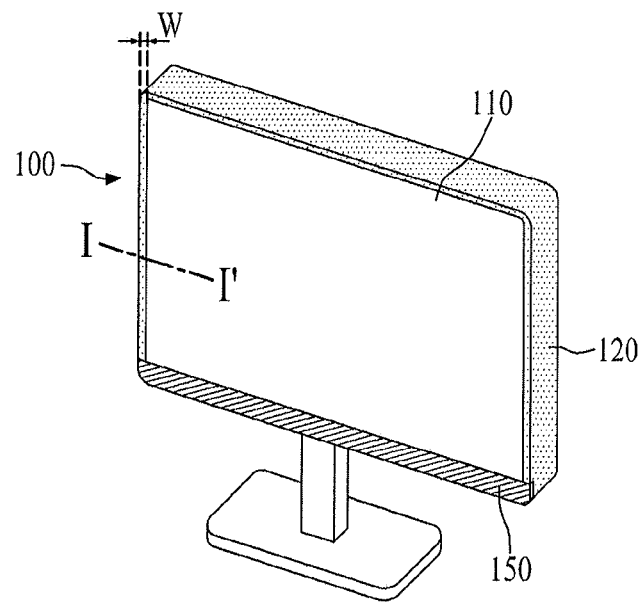
FIG. 8 illustrates a television (or monitor) with the display device according to the first embodiment of the present invention.

It can be seen from the above description that the display device 100 according to the first embodiment of the present invention is adapted to be as a display device for a notebook computer, as shown in FIG. 2. However, it is not limited to the notebook computer. As shown in FIG. 8, the display device 100 according to the first embodiment of the present invention is also adapted to be as a display device for television (or monitor), tablet computer (not shown), or various mobile information devices (not shown).

Figure 9:
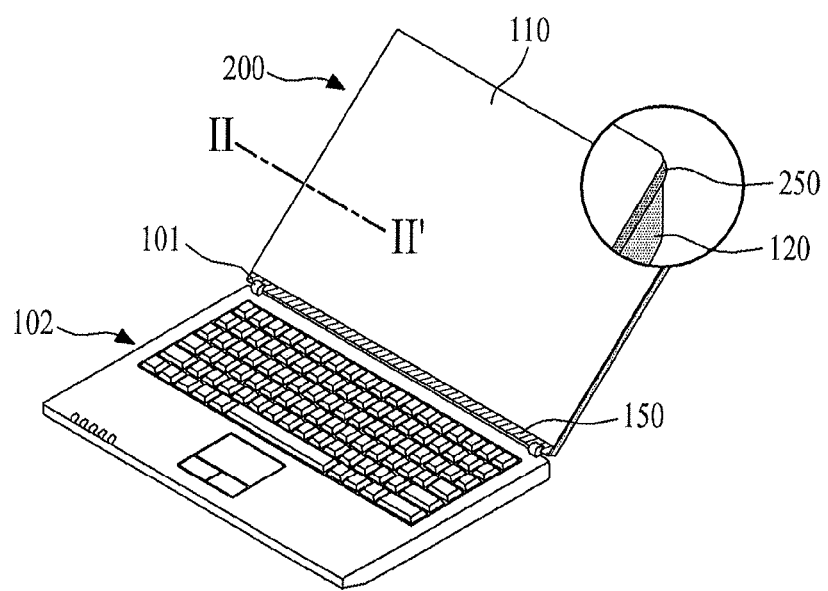
FIG. 9 illustrates a notebook computer with a display device according to the second embodiment of the present invention.
Figure 10:
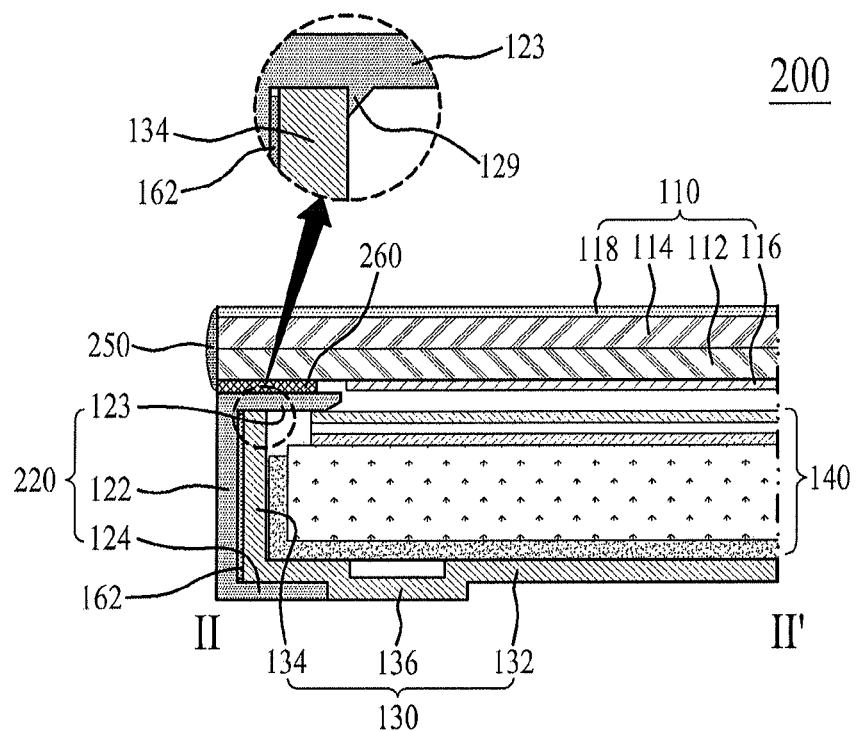
FIG. 10 is a cross sectional view taken along II-II' line of FIG. 9.

FIG. 9 illustrates a display device according to the second embodiment of the present invention, which is used as a display device for a notebook computer. FIG. 10 is a cross sectional view taken along II-II' line of FIG. 9.

Referring to FIGS. 9 and 10, the display device 200 according to the second embodiment of the present invention includes a display panel 110; a guide frame 220 which is connected to the display panel 110 so as to expose upper and side surfaces of the display panel 110 to the outside of the display device; a rear cover 130 which supports the guide frame 120, and is covered by the guide frame 120; and a side sealing member 250 which covers the side surface of the display panel 110. Except the guide frame 220 and side sealing member 250, the other parts of the display device 200 according to the second embodiment of the present invention are the same as those of the display device 100 shown in FIGS. 2 and 3, whereby repetitive description for the same parts will be omitted. In particular, except that the panel cover portion 125 is not provided in the guide frame 220 according to the second embodiment of the present invention, the guide frame 220 according to the second embodiment of the present invention is the same as the guide frame 120 according to the first embodiment of the present invention.

The guide frame 220 is connected to a lower border portion of the display panel 110 by using a panel connection member 260 such as double-sided tape or adhesive. The guide frame 220 exposes three side surfaces of the display panel 110 except the side surface of the display panel 110 which is connected to a system body 102 by a hinge 101, whereby the exposed side surfaces function as a side cover of the display device 200. For this end, the guide frame 220 is formed to cover an edge portion of the rear cover 130 including an upper surface, side surface, and lower border portion of the rear cover 130, and is connected to the edge portion of the rear cover 130. A detailed structure of the guide frame 220 will be described later.

The connection member 260 may be connected to a lower border portion of a first substrate 112, or a lower border portion of a first polarizing member 116.

Meanwhile, a pad prepared at one side of the first substrate 112 may be covered by a deco cover 150 connected to the guide frame 220. In this case, the deco cover 150 covers the hinge 101, and also covers one side of the guide frame 220 at which the pad is disposed. An upper surface of the deco cover 150 is in the same height as an upper surface of the display panel 110.

The side sealing member 250 is formed on the three side surfaces of the display panel 110 which are exposed to the outside of the display device, that is, the upper side, the left side, and the right surface of the display panel 110. Thus, the side sealing member 250 covers the three side surfaces of the display panel 110. Specifically, the side sealing member 250 covers the three side surfaces of the first and second substrates 112 and 114 and the second polarizing member 118.

The above side sealing member 250 may be formed of silicon-based sealant or ultraviolet ray (UV) curable sealant (or resin). However, in consideration of tack time, the side sealing member 250 is preferably formed of UV curable sealant. Also, the side sealing member 250 may be colorless (or transparent), or colored (for example, blue, red, bluish green, or black), but it is not limited to these. The color of the sealant may be selectively determined depending to the design of the display device. In order to prevent light from leaking from the side of the display panel 110, the side sealing member 250 is preferably formed of the colored resin or light-shielding resin.

Figure 11:
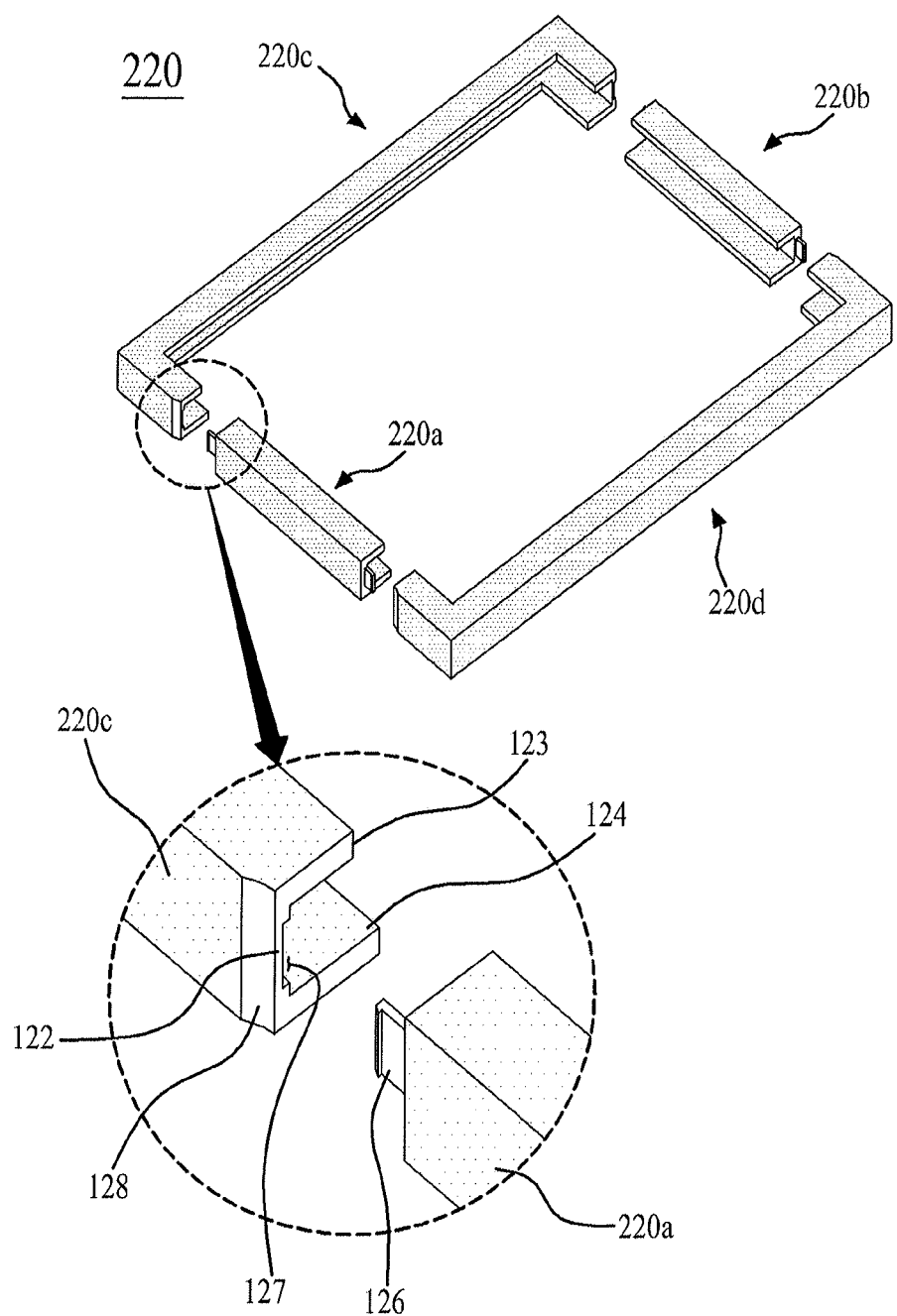
FIG. 11 is a perspective view illustrating a guide frame shown in FIG. 10, which includes four partial frames, i.e., the first to fourth partial frames in a separate state.
Figure 12:
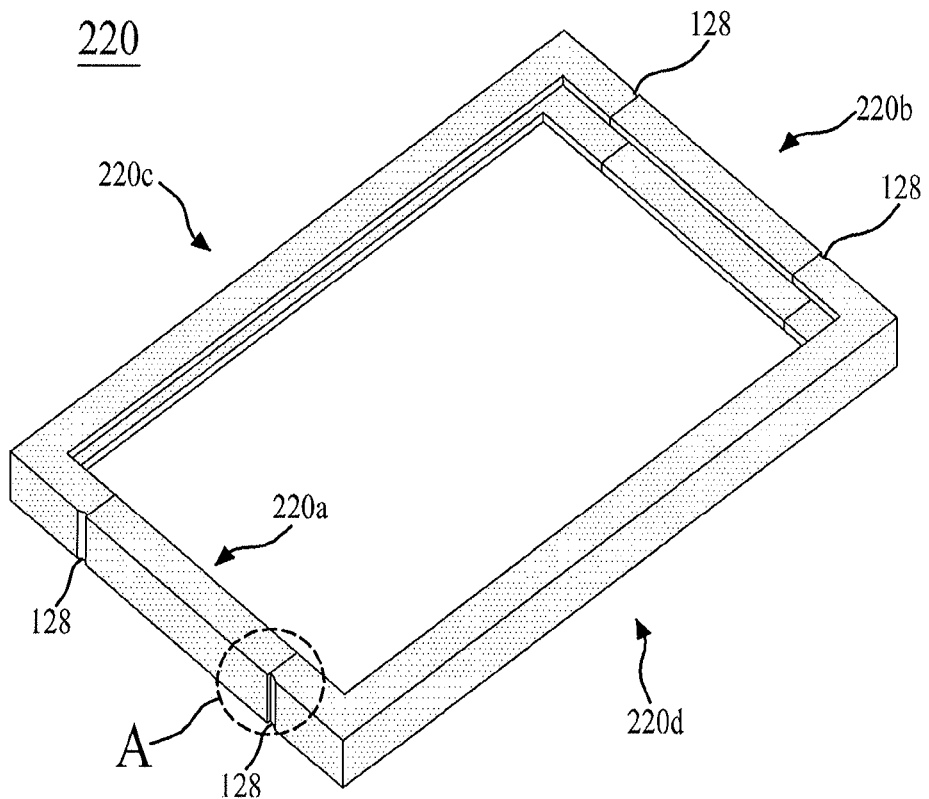
FIG. 12 illustrates a combination state of the first to fourth partial frames shown in FIG. 11.

FIG. 11 is a perspective view illustrating the guide frame shown in FIG. 10, which includes four partial frames, i.e., the first to fourth partial frames 220a to 220d in a separate state. FIG. 12 illustrates a combination state of the first to fourth partial frames shown in FIG. 11.

Referring to FIG. 10 to FIG. 12, the guide frame 220 includes the first to fourth partial frames 220a, 220b, 220c, and 220d which are combined to form the guide frame 220 of a rectangular shape.

Each of the first to fourth partial frames 220a, 220b, 220c, and 220d includes a guide sidewall 122, a panel connection portion 123, a rear cover portion 124, first and second hook members 126 and 127, a groove 128, and a connection hook 129. Except that the panel cover portion 125 included in the guide frame 120 according to the first embodiment of the present invention is not provided, the first to fourth partial frames 220a, 220b, 220c, and 220d shown in FIG. 12 are the same as the first to fourth partial frames 120a, 120b, 120c, and 120d shown in FIG. 5, whereby repetitive description for the same parts will be omitted. The respective first to fourth partial frames 220a, 220b, 220c, and 220d are connected to a sidewall 134 to cover the edge portion of the rear cover 130, and are connected to the lower border portion of the display panel 110.

A method of assembling the display device 200 according to the second embodiment of the present invention will be described as follows.

First, a backlight unit 140 is received in a space formed by the rear cover 130.

Then, the guide frame 220 is connected to the rear cover 130. That is, the first and second partial frames 220a and 220b are respectively connected to the first and second short sides of the sidewall 134; and the third and fourth partial frames 220c and 220d are respectively connected to the first and second long sides of the sidewall 134, and also connected to the first and second partial frames 220a and 220b. Accordingly, the upper surface, side surface, and lower border portion of the rear cover 130 are covered by the first to fourth partial frames 220a, 220b, 220c, and 220d. The first to fourth partial frames 220a, 220b, 220c, and 220d are respectively connected to the sidewall 134 by the frame connection member 162, which can be formed on the outer surface of the sidewall 134 or the inner surface of the guide sidewall 122.

By the use of panel connection member 260, the display panel 110, whose three side surfaces are covered by the side sealing member 250, is connected to the panel connection portion 123 in each of the first to fourth partial frames 220a, 220b, 220c, and 220d. Accordingly, the upper surface, left surface and right surface of the display panel 110 are not covered by the guide frame 220.

Then, the deco cover 150 is connected to the rear cover 130, to thereby cover the lower portion of the display panel 110. Accordingly, the upper surface of the display panel 110 is exposed to the outside of the display device, except the lower portion covered by the deco cover 150.

As mentioned above, the display device 200 according to the second embodiment of the present invention includes the guide frame 220 which supports the display panel 110, and covers the edge portion of the rear cover 130. Thus, the display device 200 according to the second embodiment of the present invention has the narrow bezel (W) and the thin thickness because there is no need for a front cover used in the related art; and realizes the flat front surface of the display panel 110 except the deco cover 150, whereby the display device 200 according to the second embodiment of the present invention has the good aesthetic appearance.

Figure 13:
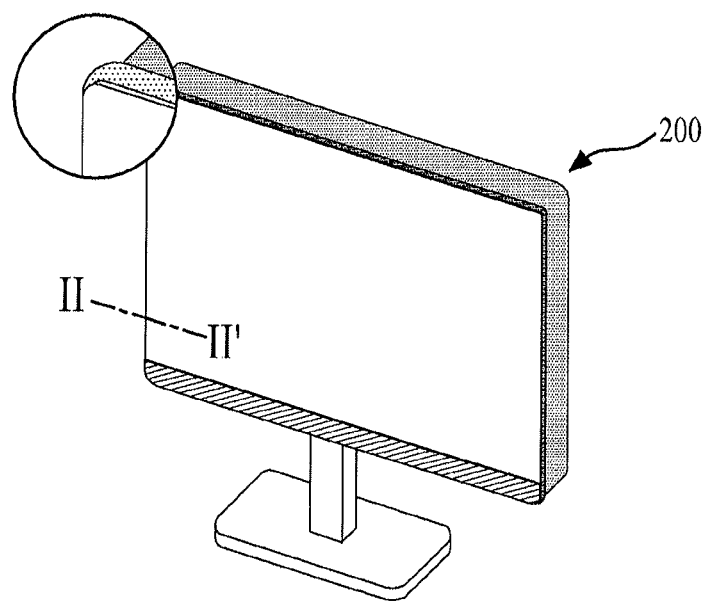
FIG. 13 illustrates a television (or monitor) with the display device according to the second embodiment of the present invention.

It can be seen from the above description that the display device 200 according to the second embodiment of the present invention is adapted to be as a display device for a notebook computer, as shown in FIG. 9. However, it is not limited to the notebook computer. As shown in FIG. 13, the display device 200 according to the second embodiment of the present invention is also adapted to be as a display device for television (or monitor), tablet computer (not shown), or various mobile information devices (not shown).

The above explanation describes the display device 100 and the display device 200 as a liquid crystal display device. However, the display device 100 and the display device 200 according to the present invention are not limited to the above mentioned liquid crystal display device. The display device 100 and the display device 200 according to the present invention can be other various flat display devices such as an organic light emitting display device, etc. For example, in case of the organic light emitting display device, an organic light emitting device is formed on an upper substrate or a lower substrate, and the organic light emitting device is driven by a panel driver connected to the upper substrate or the lower substrate so that an image is displayed on the upper substrate.

Accordingly, the display device according to the present invention is provided with the guide frame which supports the display panel and covers the edge portion of the rear cover so that it is possible to minimize or remove the bezel in the other portions except one side of the display panel, to decrease the thickness of the display device by removing the front cover used in the related art, and to obtain the flat front surface of the display panel except the deco cover, whereby the display device according to the present invention has the good aesthetic appearance.

It will be apparent to those skilled in the art that various modifications and variations can be made in the present invention without departing from the spirit or scope of the inventions. In particular, in the above description, the guide frame 120 and guide frame 220 are divided into four partial frames. However, it is not limited to such division. The guide frame 120 and guide frame 220 can be divided into a plurality of partial frames other than the four partial frames. For example, the partial frames 120a and 120b and the partial frames 220a and 220b can be divided into two partial frames of a shape "-". Similarly, the partial frames 120c and 120d and the partial frames 220c and 220d can be divided into two partial frames of a shape "⌐" having one bending portion. Further, the partial frames 120c and 120d and the partial frames 220c and 220d can be divided into three partial frames, one of which is of a shape "-" and two of which are of a shape "⌐" having one bending portion. Similar hook members like the first and second hook members 126 and 127 can be provided to the partial frames to connect them into the guide frame 120 and the guide frame 220.

Thus, it is intended that the present invention covers the modifications and variations of this invention provided they come within the scope of the appended claims and their equivalents.

The invention claimed is:

1. A display device comprising:
a display panel for displaying an image;
a guide frame, including:
  a vertical guide sidewall having an outer side and an inner side,
  a horizontal panel connection portion extending from the inner side and at an upper portion of the vertical guide sidewall to support the display panel thereon, wherein the horizontal panel connection portion includes a connection hook protrusion,
  a horizontal rear cover portion extending from the inner side of the vertical guide sidewall for forming support to a backlight unit having a reflective sheet and a light guide plate, and to a rear cover, and
  a panel cover portion extending above the horizontal panel connection portion from the vertical guide sidewall to surround the peripheral edge of the display panel,
  wherein the horizontal panel connection portion and the panel cover portion encase and support the display panel; and
wherein the rear cover being an outermost rear cover of the display device, is coupled to the guide frame, includes:
  a rear plate which supports and covers the backlight unit, wherein the rear plate includes an inner surface and an outer surface, and having a protrusion portion which protrudes outward with respect to a remaining portion of the outer surface of the rear place for enhancing stiffing of the rear cover, and
  a vertical sidewall portion extending from a surrounding edge above the inner surface of the rear plate for encasing a peripheral edge of the backlight unit, wherein the vertical sidewall portion is fixed between the vertical guide sidewall of the guide frame and the connection hook protrusion of the horizontal panel connection portion, and
  wherein the protrusion portion of the rear plate is disposed at a predetermined distance away from the vertical sidewall portion, and a space is formed between an inner surface of the protrusion portion and a back surface of the backlight unit, such that the reflective sheet of the backlight unit covers entirely the space formed in the protrusion portion;
  wherein the horizontal rear cover portion of the guide frame covers an edge portion of the outer surface of the rear plate of the rear cover;
  wherein an outer surface of the protrusion portion protrudes outward with respect to a remaining portion of the outer surface of the rear plate to partially cover a side surface of the horizontal rear cover portion of the guide frame without extending beyond a rear surface of the horizontal rear cover portion of the guide frame;
  wherein the reflective sheet covers both a bottom surface and a side surface of the light guide plate, and a corner of the rear cover is sandwiched between a corner of the guide frame and a corner of the reflective sheet; and
  wherein the protrusion portion of the rear cover contacts the horizontal rear cover portion in a same plane and the outer surface of the protrusion and an outer surface of the horizontal rear cover portion provide a flush surface.

2. The display device according to claim 1, wherein the vertical sidewall portion of the rear is covered by the guide frame and disposed between the panel connection portion and the horizontal rear cover portion of the guide frame, with no portion of the vertical sidewall portion of the rear cover extends beyond the panel connection portion.

3. The display device to claim 2, wherein the backlight unit emits light to the display panel, the backlight unit being received in a space formed by the rear cover.

4. The display device according to claim 1, wherein the guide frame comprises a plurality of partial frames, having two major sides joined by two minor sides.

5. The display device according to claim 4, wherein each of the plurality of partial frames includes:
the vertical guide sidewall connected to the vertical sidewall of the rear cover;
the horizontal panel connection portion is connected to a bottom periphery of the display panel, and being supported by the vertical sidewall portion of the rear cover.

6. The display device according to claim 5, further comprising a frame connection member disposed between the inner side of the vertical guide sidewall of the partial frames and the outer surface of the vertical sidewall portion of the rear cover.

7. The display device according to claim 6, wherein the guide frame further includes a groove on at least one side of the plurality of the partial frames, wherein the groove is slanted at a predetermined inclination or curved concavely of convexly with a predetermined curvature.

8. The display device according to claim 1, further comprising a polarizing member attached to the upper surface of the display panel.

9. A display device comprising:
a display panel for displaying an image;
a guide frame, including:
a vertical guide sidewall having an outer side and an inner side,
a horizontal panel connection portion extending from the inner side and at an upper portion of the vertical guide sidewall to support the display panel thereon, wherein the horizontal panel connection portion includes a connection hook protrusion,
a horizontal rear cover portion extending from the inner side of the vertical guide sidewall for forming support to a backlight unit having a reflective sheet and a light guide plate, and to a rear cover,
a panel cover portion extending above the horizontal panel connection portion from the vertical guide sidewall to surround the peripheral edge of the display panel, wherein the horizontal panel connection portion and the panel cover portion encase and support the display panel, and
a side sealing member covering side surfaces of the display panel;
wherein the rear cover being an outermost rear cover of the display device, is coupled to the guide frame, includes:
a rear plate which supports and covers the backlight unit, wherein the rear plate includes an inner surface and an outer surface, and having a protrusion portion which protrudes outward with respect to a remaining portion of the outer surface of the rear place for enhancing stiffing of the rear cover, and
a vertical sidewall portion extending from a surrounding edge above the inner surface of the rear plate for encasing a peripheral edge of the backlight unit, wherein the vertical sidewall portion is fixed between the vertical guide sidewall of the guide frame and the connection hook protrusion of the horizontal panel connection portion, and
wherein the protrusion portion of the rear plate is disposed at a predetermined distance away from the vertical sidewall portion and a space is formed between an inner surface of the protrusion portion and a back surface of the backlight unit, such that the reflective sheet of the backlight unit covers entirely the space formed in the protrusion portion;
wherein the horizontal rear cover portion of the guide frame covers an edge portion of the outer surface of the rear plate of the rear cover;
wherein an outer surface of the protrusion portion protrudes outward with respect to a remaining portion of the outer surface of the rear plate to partially cover a side surface of the horizontal rear cover portion of the guide frame without extending beyond a rear surface of the horizontal rear cover portion of the guide frame;
wherein the reflective sheet covers both a bottom surface and a side surface of the light guide plate, and a corner of the rear cover is sandwiched between a corner of the guide frame and a corner of the reflective sheet; and
wherein the protrusion portion of the rear cover contacts the horizontal rear cover portion in a same plane and the outer surface of the protrusion and an outer surface of the horizontal rear cover portion provide a flush surface.

10. The display device according to claim 9, wherein the side sealing member is formed on three side surfaces of the display panel which are exposed to the outside of the display device.

11. The display device according to claim 9, wherein the guide frame comprises a plurality of partial frames having two major sides joined by two minor sides, wherein a frame connection member disposed between the inner side of the vertical guide sidewall of the partial frames and the outer surface of the vertical sidewall portion of the rear cover.

12. The display device according to claim 11, wherein the guide frame further includes a groove on at least one side of the plurality of the partial frames, wherein the groove is slanted at a predetermined inclination or curved concavely or convexly with a predetermined curvature.

13. A display device comprising:
a display panel;
a plurality of partial frames jointly defining a guide frame for supporting the display panel, each of the partial frames including:
a vertical guide sidewall having an outer side and an inner side,
a horizontal panel connection portion extending from the inner side and at an upper portion of the vertical guide sidewall to support the display panel thereon, wherein the horizontal panel connection portion includes a connection hook protrusion,
a horizontal rear cover portion extending from the inner side of the vertical guide sidewall for forming support to a backlight unit having a reflective sheet and a light guide plate, and to a rear cover, and a panel cover portion extending above the horizontal panel connection portion from the vertical guide sidewall to surround the peripheral edge of the display panel, wherein the horizontal panel connection portion and the panel cover portion encase and support the display panel; and wherein the rear cover being an outermost rear cover of the display device, is coupled to the guide frame, including:
- a rear plate which supports and covers the backlight unit, wherein the rear plate includes an inner surface and an outer surface, and having a protrusion portion which protrudes outward with respect to a remaining portion of the outer surface of the rear place for enhancing stiffing of the rear cover, and
- a vertical sidewall portion extending from a surrounding edge above the inner surface of the rear plate for encasing a peripheral edge of the backlight unit, wherein the vertical sidewall portion is fixed between the vertical guide sidewall of the guide frame and the connection hook protrusion of the horizontal panel connection portion, and wherein the protrusion portion of the rear plate is disposed at a predetermined distance away from the vertical sidewall portion and a space is formed between an inner surface of the protrusion portion and a back surface of the backlight unit, such that the reflective sheet of the backlight unit covers entirely the space formed in the protrusion portion;

wherein the horizontal rear cover portion of the guide frame covers an edge portion of the outer surface of the rear plate of the rear cover;

wherein an outer surface of the protrusion portion protrudes outward with respect to a remaining portion of the outer surface of the rear plate to partially cover a side surface of the horizontal rear cover portion of the guide frame without extending beyond a rear surface of the horizontal rear cover portion of the guide frame;

wherein the reflective sheet covers both a bottom surface and a side surface of the light guide plate, and a corner of the rear cover is sandwiched between a corner of the guide frame and a corner of the reflective sheet; and wherein the protrusion portion of the rear cover contacts the horizontal rear cover portion in a same plane and the outer surface of the protrusion and an outer surface of the horizontal rear cover portion provide a flush surface.

14. The display device according to claim 13, wherein the vertical sidewall portion of the rear cover is covered by the guide frame.

15. The display device according to claim 14, wherein the plurality of partial frames are combined with one another at their sides to form the guide frame.

* * * * *